United States Patent [19]

Brown et al.

[11] Patent Number: 5,226,702
[45] Date of Patent: Jul. 13, 1993

[54] CONCENTRIC SOLENOID VALVE AND SUMP ASSEMBLY

[75] Inventors: George E. Brown, Niles, Mich.; Chester A. Creech, North Liberty, Ind.

[73] Assignee: Allied-Signal Inc., Morristown, N.J.

[21] Appl. No.: 872,480

[22] Filed: Apr. 23, 1992

Related U.S. Application Data

[63] Continuation-in-part of Ser. No. 792,550, Nov. 15, 1991.

[51] Int. Cl.$^5$ ............................................. B60T 8/36
[52] U.S. Cl. ............................ 303/119.2; 137/596.17
[58] Field of Search ................ 303/119.5 V, 119.2; 137/625.65, 596.17

[56] References Cited

U.S. PATENT DOCUMENTS

| | | | |
|---|---|---|---|
| 4,312,380 | 1/1982 | Leiber | 137/596.17 |
| 4,526,203 | 7/1985 | Leiber | 137/596.17 |
| 4,620,565 | 11/1986 | Brown | 137/596.17 |
| 4,844,119 | 7/1989 | Martinic | 137/596.17 |
| 4,936,344 | 6/1990 | Gilbert et al. | 137/596.17 |
| 4,938,545 | 7/1990 | Shuey et al. | 303/119 |
| 4,972,873 | 11/1990 | Fulmer et al. | 137/505.13 |
| 5,005,919 | 4/1991 | Shuey et al. | 303/119 |

Primary Examiner—Matthew C. Graham
Attorney, Agent, or Firm—Larry J. Palguta; Ken C. Decker

[57] ABSTRACT

The combination solenoid valve and sump assembly comprises a solenoid valve (40, 140, 240, 340, 440) located within a stepped bore (16) of a modulator body (15) of an adaptive braking system (10). The solenoid valve (40, 140, 240, 340, 440) includes a slidable shuttle valve (50) disposed sealingly at an end thereof, and the sump (80, 180, 280, 380; 480) is disposed coaxially relative to the solenoid valve. A movable piston (70) engages sealingly both the solenoid valve (40) and a portion of the stepped bore (16) in a first embodiment, and is biased by a spring (73, 74) located concentrically relative to the windings (41) of the solenoid valve (40). The stepped bore (16) communicates with a pump (14) which, along with a master cylinder (20), provides fluid pressure to appropriate portions of the stepped bore (16). The movable piston (70), solenoid valve (40), and stepped bore (16) define a sump chamber (80) which receives fluid decayed away from a brake connection line (24) communicating with the stepped bore (16), and retains the fluid for communication to the pump (14) of the system (10). Other embodiments provide the movable piston (170, 242, 370, 470) at the rear of the solenoid valve (140, 340) and as a movable housing pole part (242), and located sealingly and slidably about a movable solenoid rod (443) of the solenoid valve (440).

15 Claims, 3 Drawing Sheets

CONCENTRIC SOLENOID VALVE AND SUMP ASSEMBLY

This application is a continuation-in-part of U.S. patent application Ser. No. 07/792,550 filed Nov. 15, 1991.

The present invention relates generally to a solenoid valve and sump for an adaptive braking system, and in particular to a concentric solenoid valve and sump assembly.

Numerous adaptive braking systems have been proposed previously. Adaptive braking systems can typically include several solenoid valves, check valves, flow restrictions, shuttle valves, and various types of pressure sources and fluid retention mechanisms. In adaptive braking systems which comprise pumpback adaptive braking systems, it is typical to utilize a small low pressure displacement chamber or sump to receive fluid pressure from the brakes during the decay mode of operation. The sump permits the storage of low pressure fluid and communicates this fluid with the inlet side of the pressure source which usually comprises a pump. Typically, one sump is provided for each pumping circuit. It is highly desirable to integrate the sump with another portion of the adaptive braking system in order to eliminate communication ports, plugs and piping associated therewith. Previously, sumps have been combined with adaptive braking system devices such as an accumulator. U.S. Pat. Nos. 4,738,595 and 4,769,990 illustrate combined accumulator and sump constructions. Pumpback types of adaptive braking systems may now be provided without the necessity of an accumulator, which further simplifies and reduces the cost of the entire system. Therefore, it is highly desirable to combine the sump with a part of the system that is directly in the path of fluid flowing to the pump. It would be very advantageous if the sump could be combined with a solenoid valve utilized in a pumping circuit.

The present invention provides solutions to the above problems by a combination solenoid valve and sump, comprising a body having therein a stepped bore, a solenoid valve disposed within the bore and operable to open a valve associated therewith in order to communicate one portion of the stepped bore with another portion thereof, the bore communicating with a source of pressurized fluid and with means for supplying fluid, and a movable piston biased by a spring and both disposed coaxially with a valve rod of said solenoid valve, the movable piston and a housing of said solenoid valve defining substantially a variable volume sump chamber communicating with the fluid supplying means.

One way of carrying out the invention is described in detail below with reference to the drawings which illustrate embodiments in which.

Figure 1:
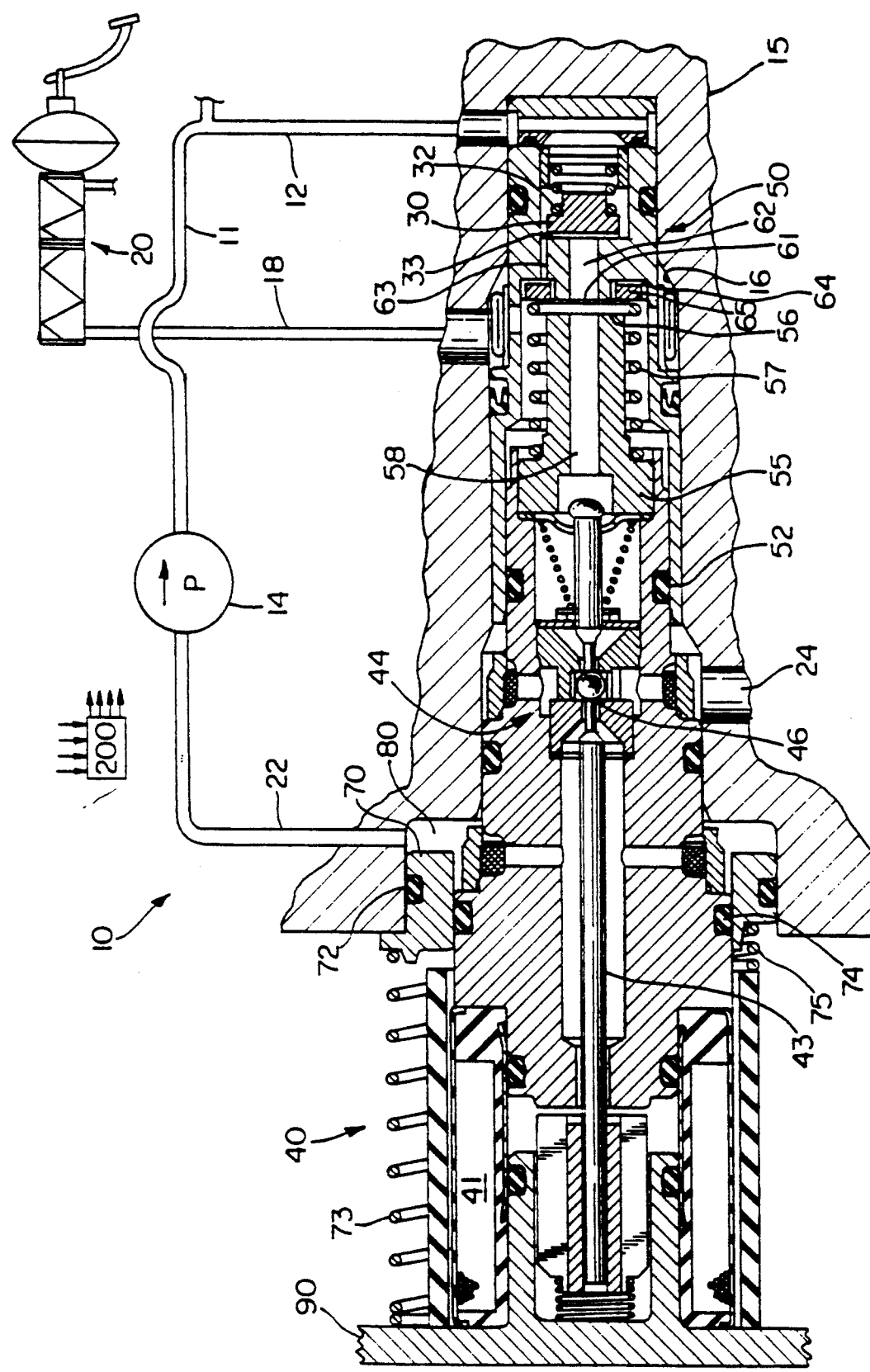
FIG. 1 is a part of an adaptive braking system with a section view of a concentric solenoid valve and sump assembly of the invention.

FIG. 1 illustrates schematically part of an adaptive braking system designated generally by reference numeral 10. Adaptive braking system 10 includes connection line 12 communicating pump 14 with stepped bore 16 of modulator body 15. Stepped bore 16 receives fluid pressure via connection line 18 that communicates with master cylinder 20. Stepped bore 16 communicates with connection line or fluid supplying means 22 which communicates fluid to the inlet side of pump 14. Stepped bore 16 also includes connection line 24 connected with one or more wheel brakes. Other portions of system 10 are not shown.

Disposed within stepped bore 16 is a combination solenoid valve 40 and shuttle valve 50. The combination solenoid valve and shuttle valve is similar to that disclosed valve 50 sealingly and slidingly engages seal 52 disposed about an end of solenoid valve 40, and the solenoid valve is similar to that disclosed in U.S. Pat. No. 5,163,474 wherein the shuttle valve is incorporated within an end of the solenoid valve. Shuttle valve 50 includes shuttle insert 55 biased by spring 57, the valve 50 slidable under the effect of fluid pressure such that end 56 of insert 55 may be engaged by valve seat 61 of valve 50 to effect substantially an isolation of fluid pressure being received from master cylinder 18. Pump check valve 30 is biased by spring 32 and includes build orifice 33 which communicates with through opening 62 of shuttle valve 50. Pumpback opening 63 communicates with pumpback orifice 64 of washer 65 that permits a portion of fluid pressure from the pump to be communicated with connection line 18 and master cylinder 20 when valve seat 61 engages insert seat 56. Insert 55 includes through opening 58 for transmitting fluid pressure to ball valve 44 operated by solenoid valve 40. Solenoid valve 40 includes valve rod 43 which extends to engage ball valve 44 and move ball valve 44 away from seat 46 when solenoid valve 40 is energized. Located concentrically and coaxially about solenoid valve 40 is movable sump piston 70 which includes seal 72 sealingly engaging stepped bore 16, and piston 70 engages seal 74 disposed about solenoid valve 40. Movable sump piston 70, stepped bore 16, solenoid valve 40 define variable volume sump chamber 80 which communicates via line 22 with the inlet side of pump 14. Movable piston 70 is biased toward sump chamber 80 by spring 73 illustrated in the top portion of FIG. 1. Solenoid valve 40 may be captured within stepped bore 16 by means of plate 90 which provides a seat for spring 73 that biases movable sump piston 80. The bottom portion of FIG. 1 illustrates alternatively a spring 74 which may extend between a shoulder of solenoid valve 40 and movable piston 72.

During adaptive braking system operation, pump 14 is energized by ECU 200 which communicates with not shown wheel speed sensors. Fluid pressure is transmitted via lines 11 and 12 to pump check valve 30. The fluid pressure from pump 14 causes shuttle valve 50 to translate to the left in FIG. 1 so that valve seat 61 engages seat 56 of insert 55 and effects substantially an isolation of master cylinder 20 from the not shown brake(s) communicating with bore 16 via connection line 24. Fluid pressure provided by pump 14 passes through build orifice 33 and through openings 62 and 58 for communication to ball valve 44. Fluid pressure from pump 14 also passes through opening 63 and pumpback orifice 64 so that a small portion of the fluid pressure is transmitted back toward master cylinder 20. Upon initial activation by ECU 200, solenoid valve windings 41 cause a displacement of rod 43 so that ball valve 44 is moved from seat 46 and fluid pressure at the not shown brake(s) is permitted to decay from connection line 24 to sump chamber 80. The small amount of low pressure fluid which is communicated to sump chamber 80 may cause movable sump piston 72 to be displaced against spring 73/74 so that the decayed fluid pressure can be absorbed by the system until it is utilized via connection line 22 by the pump 14. During adaptive braking system operation, solenoid valve 40 modulates ball valve 44 so that fluid pressure from pump 14 may be supplied to the not shown wheel brake(s) or fluid pressure at the wheel brake(s) decayed to the sump chamber and inlet side of pump 14.

The present invention provides in FIG. 1 a variable volume sump that is concentrically located relative to the solenoid such that the decay pressure is absorbed directly into the sump chamber. The present invention provides for the utilization of one solenoid valve with a concentric sump per pumping circuit, as long as there is sufficient bore size or sump piston stroke provided for the required displacement. Optionally, each solenoid valve of the adaptive braking system could contain a concentric sump. In that case, each sump piston could be of a smaller size or have a smaller stroke because the required fluid displacement would be shared between the sumps.

Figure 2:
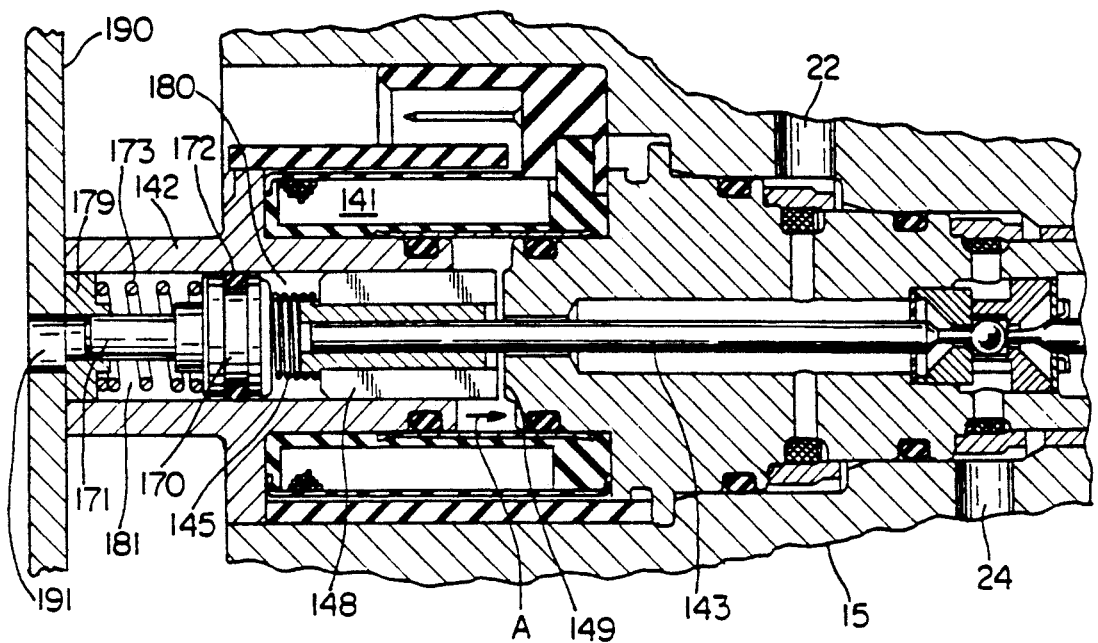
FIG. 2 is a section view of a second embodiment of the invention.

Referring to FIG. 2, solenoid valve 140 includes solenoid rod 143 positioned slidably within solenoid housing part 142. Spring 145 biases solenoid rod 143 toward an opposite end of the solenoid. In this embodiment, movable sump piston 170 includes thereabout seal 172 engaging housing part 142 and piston 170 is biased by spring 173 toward sump chamber 180. Piston 170 includes shaft 171 received slidably within housing part 179 which serves as a piston guide. Housing chamber 181 is vented to atmosphere via cover plate opening 191. Solenoid valve 140 is of the type which is either fully on when activated or fully off when deactivated. Therefore, when solenoid valve 140 is activated by the energization of coils 141, solenoid rod 143 and associated armature 148 move in the direction of arrow A until the end of armature 148 engages solenoid housing pole shoulder 149. Housing pole shoulder 149 limits the forward stroke of solenoid rod 143 which opens the associated ball valve of the solenoid by the desired amount. Thus, when movable sump piston 170 is in a retracted position closer to plate 190, spring 145 need only have resiliency sufficient to maintain solenoid rod 143 and solenoid vanes 148 in approximately the position shown such that the rod when activated has to travel only a short distance before it engages pole shoulder 149.

Figure 3:
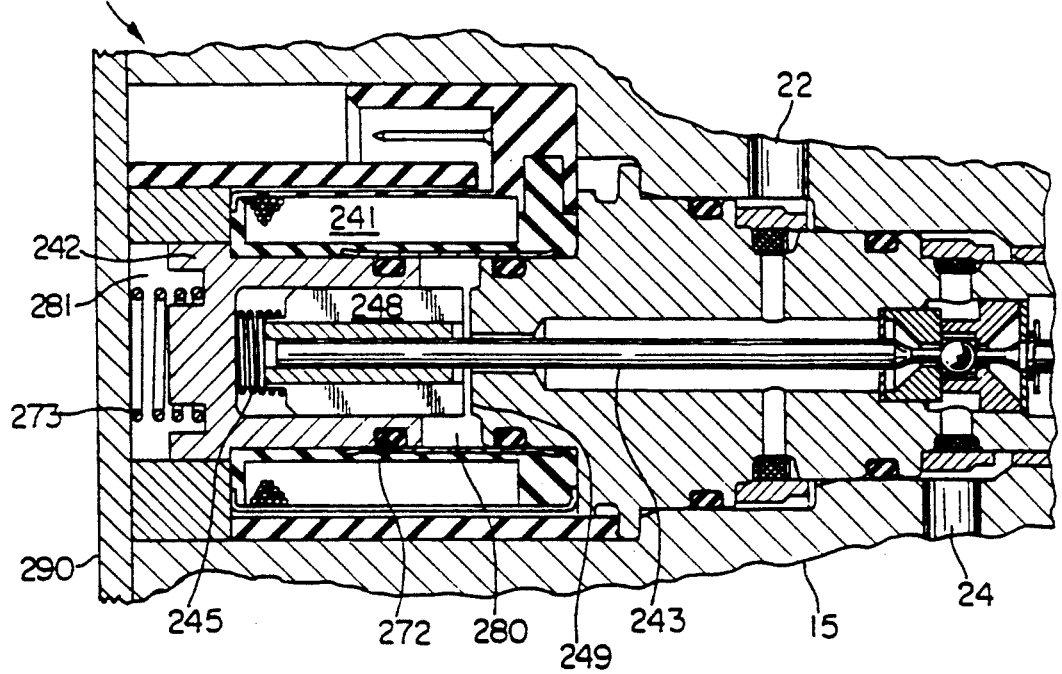
FIG. 3 is a section view of a third embodiment of the invention.

FIG. 3 illustrates solenoid valve 240 which includes movable housing pole part 242 (with seal 272) that is biased by spring 273 toward sump chamber 280. Resilient spring 245 biases solenoid rod 243 toward an opposite end of solenoid valve 240. The engagement between plate 290 and solenoid valve 240 is without the utilization of a seal so that air within chamber 281 can vent and permit pole part 242 to move. Pole part 242 comprises the movable sump piston which, when fluid is decayed away from the associated ball valve, retracts to receive fluid within sump chamber 280 until the decayed fluid is utilized by the associated pump. Again, spring 245 need only position solenoid rod 243 and armature 248 approximately in the position shown so that when activated, rod 243 moves forward a very short distance and engages housing pole shoulder 249. The movement of pole part or movable sump piston 242 as fluid is absorbed in sump chamber 280 can affect the generated magnetic field and efficiency of the solenoid valve. However, the slight reduction in efficiency may be minimized so that it does not affect the operational speed of solenoid rod 243 when it is activated by energization of coils 241.

Figure 4:
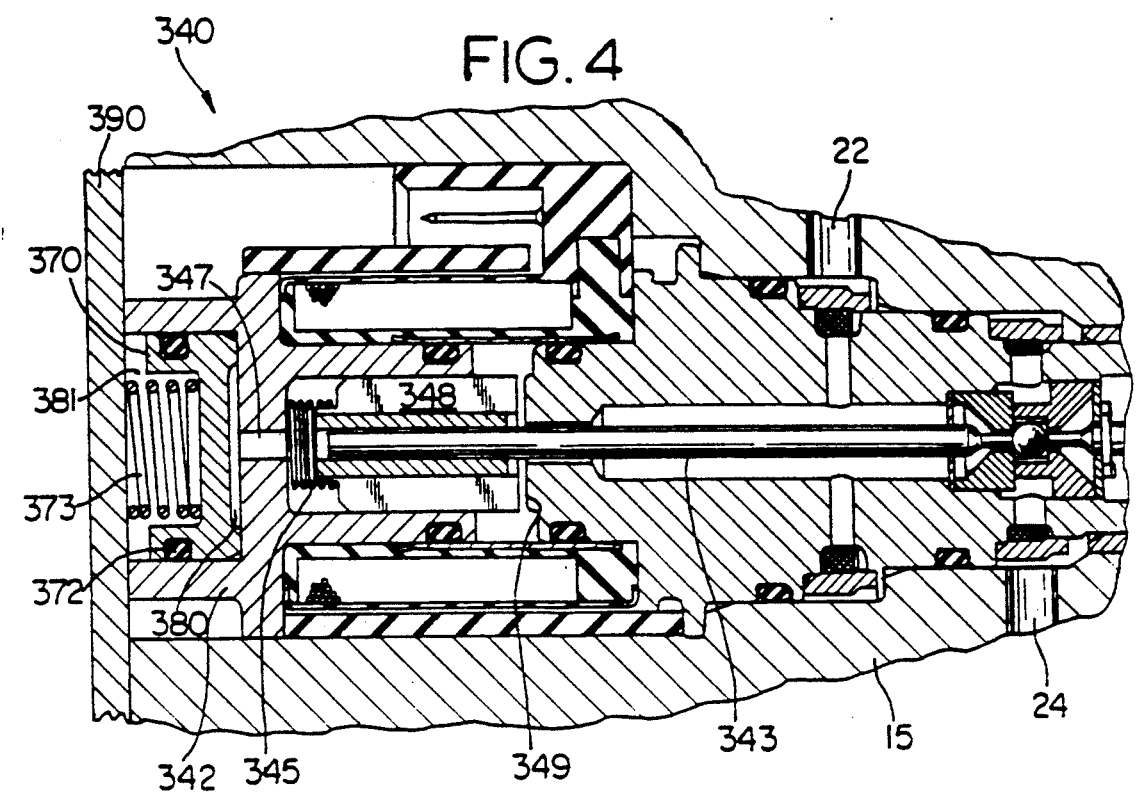
FIG. 4 is a section view of a fourth embodiment of the invention.

FIG. 4 is an illustration of a fourth embodiment of a solenoid valve with concentric sump. Solenoid valve 340 includes solenoid rod 343 with armature 348 that may engage housing pole shoulder 349 when the solenoid valve is activated. As before, solenoid rod 343 is biased by spring 345. Solenoid housing 342 includes end opening 347 which allows fluid to flow into sump chamber 380 to displace movable sump piston 370 (with seal 372) toward plate 390. Again, the engagement of solenoid valve 340 with plate 390 is without the benefit of a seal so that rear chamber 381 can be vented and permit piston 370 to be displaced against spring 373 and enlarge the volume of sump chamber 380. As fluid pressure is decayed away from a wheel brake by the associated ball valve and enters the areas around solenoid rod 343 within solenoid housing 342, the pressurized fluid may be absorbed by variable volume sump chamber 380 until the fluid is utilized by the associated not shown pump.

Figure 5:
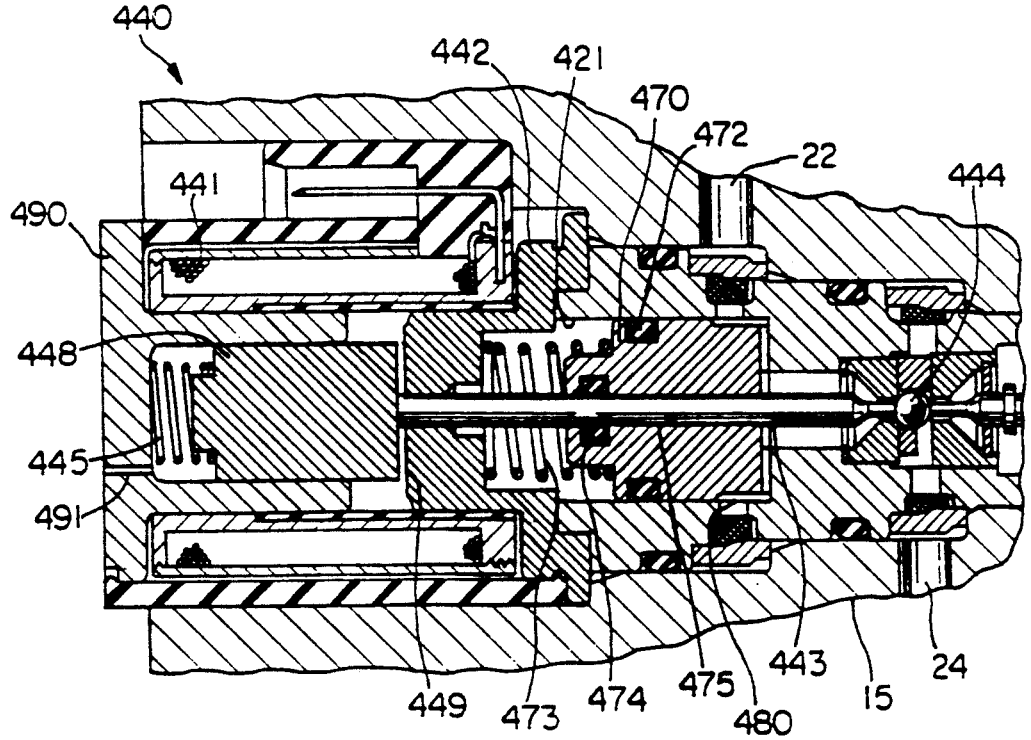
FIG. 5 is a section view of a fifth embodiment of the invention.

FIG. 5 illustrates solenoid valve 440 having coils 441 which, when energized, displace solenoid rod 443 to move ball valve 444. Solenoid rod 443 abuts armature 448 disposed a short distance from housing pole shoulder 449. Rod 443 is biased by spring 445 abutting end plate 490 which includes vent opening 491. Located about solenoid rod 443 and adjacent connection lines 22 and 24 communicating with solenoid valve 440, is movable sump piston 470 having thereabout seal 472 engaging the surface of opening 421 of housing 442. Movable sump piston 470 includes through opening 475 which includes seal 474 that sealingly engages valve rod 443. Movable sump piston 470 is biased by spring 473 toward valve 444. When solenoid valve 440 is energized and rod 443 displaced against ball valve 444 to permit fluid to be decayed away from the associated not shown wheel brake, the decayed fluid pressure can cause piston 470 to retract as the fluid is received within sump chamber 480. Fluid stored within sump chamber 480 may then be utilized via line connection 22 by the not shown pump. Although seal 474 engages sealingly and slidably rod 443, the engagement therebetween will not significantly retard the ability of rod 443 to be displaced by coils 441 during energization of solenoid valve 440.

We claim:

1. A combination solenoid valve and sump, comprising a body having therein a stepped bore, a solenoid valve disposed within the bore and operable to open a valve associated therewith in order to communicate one portion of the stepped bore with another portion thereof, the bore communicating with a source of pressurized fluid and with means for supplying fluid, and a movable piston and a spring disposed concentrically and sealingly around said solenoid valve, the movable piston sealingly engaging the bore and solenoid valve to define therewith a variable volume sump chamber communicating with the fluid supplying means.

2. The combination solenoid valve and sump in accordance with claim 1, further comprising the spring means being disposed about said solenoid valve and biasing said movable piston toward said sump chamber.

3. The combination solenoid valve and sump in accordance with claim 2, wherein said spring extends between the movable piston and a plate retaining said solenoid valve within said stepped bore.

4. The combination solenoid valve and sump in accordance with claim 2, wherein said spring is disposed between said movable piston and a shoulder of said solenoid valve.

5. The combination solenoid valve and sump in accordance with claim 1, further comprising in combination an adaptive braking system, which includes a master cylinder communicating with said stepped bore, and a shuttle valve disposed at an end of said solenoid valve.

6. A combination solenoid valve and sump, comprising a body having therein a stepped bore, a solenoid valve disposed within the bore and operable to open a valve associated therewith in order to communicate one portion of the stepped bore with another portion thereof, the bore communicating with a source of pressurized fluid and with means for supplying fluid, and a movable piston biased directly by a spring and both disposed coaxially with a valve rod of said solenoid valve, the movable piston and a housing of said solenoid valve defining substantially a variable volume sump chamber communicating with the fluid supplying means.

7. The combination solenoid valve and sump in accordance with claim 6, wherein another spring biasing said valve rod is disposed between said movable piston and valve rod.

8. The combination solenoid valve and sump in accordance with claim 7, wherein the piston includes a shaft which is slidably received within an opening of the housing.

9. The combination solenoid valve and sump in accordance with claim 8, wherein the movable piston includes a seal thereabout which engages the housing.

10. The combination solenoid valve and sump in accordance with claim 9, wherein the valve rod includes a pair of slots thereabout permitting fluid flow past said valve rod.

11. The combination solenoid valve and sump in accordance with claim 6, wherein the movable piston comprises a movable housing pole part having sealing means thereabout, the movable housing pole part disposed between the spring and another spring, one spring biasing the movable housing pole part toward the valve rod and the other spring biasing the valve rod away from said movable housing pole.

12. The combination solenoid valve and sump in accordance with claim 6, wherein the housing of said solenoid valve includes a rear chamber housing the movable piston and having an opening communicating with a separate chamber containing an end of the valve rod, the movable piston biased by the spring toward the opening and the valve rod biased away from the movable piston by another spring.

13. A combination solenoid valve and sump, comprising a body having therein a stepped bore, a solenoid valve disposed within the bore and operable to open a valve associated therewith in order to communicate one portion of the stepped bore with another portion thereof, the bore communicating with a source of pressurized fluid and with means for supplying fluid, and a movable piston biased by a spring and both disposed concentrically about a valve rod of the solenoid valve, the movable piston sealingly engaging a surface of an interior opening of a housing of said solenoid valve and sealingly and slidably engaging the valve rod which extends through the piston, and the movable piston, valve rod and housing defining a variable volume sump chamber communicating with the fluid supplying means.

14. The combination solenoid valve and sump in accordance with claim 13, wherein the variable volume sump chamber is disposed adjacent a pair of connection lines communicating with the stepped bore, a first connection line communicating with braking means and a second connection line communicating with an inlet of a pump.

15. The combination solenoid valve and sump in accordance with claim 14, wherein the valve rod abuts an armature of the solenoid valve.

* * * * *